(12) United States Patent
Li

(10) Patent No.: US 12,536,053 B2
(45) Date of Patent: Jan. 27, 2026

(54) RESOURCE TRANSFER INFORMATION DETECTION METHOD AND APPARATUS, DEVICE, AND STORAGE MEDIUM

(71) Applicant: Tencent Technology (Shenzhen) Company Limited, Shenzhen (CN)

(72) Inventor: Wenhao Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 421 days.

(21) Appl. No.: 18/326,652

(22) Filed: May 31, 2023

(65) Prior Publication Data
US 2023/0315538 A1 Oct. 5, 2023

Related U.S. Application Data

(63) Continuation of application No. PCT/CN2022/117568, filed on Sep. 7, 2022.

(30) Foreign Application Priority Data

Oct. 20, 2021 (CN) .......................... 202111221459.0

(51) Int. Cl.
  *G06F 9/50* (2006.01)
(52) U.S. Cl.
  CPC .......... *G06F 9/5077* (2013.01); *G06F 9/5072* (2013.01)
(58) Field of Classification Search
  CPC . G06F 9/5077; G06F 9/5072; G06Q 20/4016; G06Q 20/401; G06Q 20/10; G06Q 40/02
  See application file for complete search history.

(56) References Cited

U.S. PATENT DOCUMENTS

2015/0178853 A1 6/2015 Byron et al.
2017/0195994 A1* 7/2017 Cole ................... G06Q 20/326
(Continued)

FOREIGN PATENT DOCUMENTS

CN 111126828 A 5/2020
CN 111224843 A 6/2020
(Continued)

OTHER PUBLICATIONS

International Search Report and Written Opinion issued in International Patent Application No. PCT/CN2022/117568 dated Nov. 30, 2022, with English translation, 15 pages.
(Continued)

*Primary Examiner* — Francisco A Grullon
(74) *Attorney, Agent, or Firm* — Crowell & Moring LLP

(57) ABSTRACT

A resource transfer information detection method and apparatus are provided. In a process of performing resource transfer path search on a resource transfer relationship graph, a current search node, a reference node that points to the current search node and that is in a current resource transfer path, and a candidate node that the current search node points to and that is in the resource transfer relationship graph are determined. A first resource transfer time is obtained between the current search node and the reference node and a second resource transfer time between the current search node and the candidate node is obtained. When the first resource transfer time and the second resource transfer time satisfy a time difference condition, the candidate node is added to the current resource transfer path to detect a target resource transfer path.

19 Claims, 7 Drawing Sheets

(56) References Cited

U.S. PATENT DOCUMENTS

2018/0191503 A1* 7/2018 Alwar .................. H04L 9/3242
2019/0179682 A1   6/2019 Spector et al.
2022/0237600 A1* 7/2022 Jiang .................. G06Q 20/0658

FOREIGN PATENT DOCUMENTS

| CN | 111476562 A | 7/2020 |
| CN | 111695981 A | 9/2020 |
| CN | 112598510 A | 4/2021 |
| CN | 113159937 A | 7/2021 |
| JP | 2019057160 A | 4/2019 |
| WO | WO 2020/181858 A1 | 9/2020 |

OTHER PUBLICATIONS

Chinese-language Office Action issued in Chinese Application No. 202111221459.0 dated Jul. 7, 2025, with machine translation (14 pages).

* cited by examiner

RESOURCE TRANSFER INFORMATION DETECTION METHOD AND APPARATUS, DEVICE, AND STORAGE MEDIUM

RELATED APPLICATION

The present application is a continuation of PCT application PCT/CN2022/117568, filed Sep. 7, 2022, which claims priority to Chinese Patent Application No. 202111221459.0, entitled "RESOURCE TRANSFER INFORMATION DETECTION METHOD AND APPARATUS, DEVICE, AND STORAGE MEDIUM" filed with the China National Intellectual Property Administration on Oct. 20, 2021. All are incorporated by reference in their entirety.

FIELD OF THE TECHNOLOGY

The present subject matter relates to the field of computer technologies, and in particular, to a resource transfer information detection method and apparatus, a computer device, storage medium, and a computer program product.

BACKGROUND

With development of a computer technology and an Internet technology, an Internet-based online payment platform emerges, and a user may transfer money on the online payment platform. This greatly improves transaction efficiency, and reduces transaction costs.

In many cases, it is necessary to detect resource transfer information, for example, detect a transfer operation on a resource of an unauthenticated source. Currently, manual detection is mainly performed, resulting in low resource transfer information detection efficiency.

BRIEF SUMMARY

A resource transfer information detection method is provided. The method includes:
  obtaining a resource transfer identifier set, the resource transfer identifier set including a plurality of resource transfer identifiers;
  obtaining a resource transfer identifier pair corresponding to the resource transfer identifier set, and determining a resource transfer direction corresponding to the resource transfer identifier pair, each resource transfer identifier pair including two resource transfer identifiers with a resource transfer relationship in the resource transfer identifier set;
  determining a resource transfer identifier in the resource transfer identifier set as a node in a resource transfer relationship graph, and performing directed edge connection on nodes corresponding to the resource transfer identifier pair according to the resource transfer direction to obtain the resource transfer relationship graph;
  determining, in a process of performing resource transfer path search on the resource transfer relationship graph, a current search node in a current resource transfer path that is currently found, determining a node that points to the current search node and that is in the current resource transfer path as a reference node, and determining a node that the current search node points to and that is in the resource transfer relationship graph as a candidate node;
  determining first resource transfer time between the current search node and the reference node and second resource transfer time between the current search node and the candidate node; and
  adding, when the first resource transfer time and the second resource transfer time satisfy a time difference condition, the candidate node to the current resource transfer path to detect a target resource transfer path, the time difference condition is a time difference condition of flowing of a target resource from the reference node sequentially to the current search node and the candidate node.

A resource transfer information detection apparatus is provided. The apparatus includes:
  an identifier set obtaining module configured to obtain a resource transfer identifier set, the resource transfer identifier set including a plurality of resource transfer identifiers;
  a transfer direction determining module configured to obtain a resource transfer identifier pair corresponding to the resource transfer identifier set, and determine a resource transfer direction corresponding to the resource transfer identifier pair, each resource transfer identifier pair including two resource transfer identifiers with a resource transfer relationship in the resource transfer identifier set;
  a relationship graph obtaining module configured to determine a resource transfer identifier in the resource transfer identifier set as a node in a resource transfer relationship graph, and perform directed edge connection on nodes corresponding to the resource transfer identifier pair according to the resource transfer direction to obtain the resource transfer relationship graph;
  a node determining module configured to determine, in a process of performing resource transfer path search on the resource transfer relationship graph, a current search node in a current resource transfer path that is currently found, determine a node that points to the current search node and that is in the current resource transfer path as a reference node, and determine a node that the current search node points to and that is in the resource transfer relationship graph as a candidate node;
  a time determining module configured to determine first resource transfer time between the current search node and the reference node and second resource transfer time between the current search node and the candidate node; and
  a node addition module configured to add, when the first resource transfer time and the second resource transfer time satisfy a time difference condition, the candidate node to the current resource transfer path to detect a target resource transfer path, the time difference condition is a time difference condition of flowing of a target resource from the reference node sequentially to the current search node and the candidate node.

A computer device is provided, which includes a memory and a processor. The memory stores computer-readable instructions. The computer-readable instructions are executed by the processor to enable the processor to perform the resource transfer information detection method of the present subject matter.

A non-transitory computer-readable storage medium is provided. The computer-readable storage medium stores computer-readable instructions. The computer-readable instructions are executed by a processor to enable the processor to perform the resource transfer information detection method of the present subject matter.

A computer program product or computer program is provided. The computer program product or computer program includes computer-executable instructions. The computer-executable instructions are stored in a computer-readable storage medium. A processor of a computer device reads the computer-executable instructions from the computer-readable storage medium. The processor executes the computer-executable instructions to enable the computer device to perform the resource transfer information detection method of the present subject matter.

DETAILED DESCRIPTION

In order to make objectives, technical solutions, and advantages of the present subject matter clearer, the following further describes the present subject matter in detail with reference to the accompanying drawings and examples. It is to be understood that specific examples described herein are only for describing the present subject matter and not intended to limit the present subject matter.

"Embodiment" as used herein means that a specific feature, structure, or characteristic described with reference to an embodiment may be included in some embodiments of the present subject matter. The phrase appearing anywhere in the specification does not necessarily mean the same embodiment or an independent or alternative embodiment mutually exclusive of another embodiment. It is explicitly and implicitly understood by a person skilled in the art that the embodiments described in the present subject matter may be combined with other embodiments.

A resource transfer information detection method provided in accordance with the present subject matter involves a plurality of resource transfer identifiers (which may be referred to as identifiers) with a resource transfer relationship. A resource destination corresponding to an identifier may be determined based on a resource source corresponding to the identifier, and a resource transfer identifier that performs resource transfer on a resource of an unapproved source is further determined to form a transfer path, for example, a transfer path including a plurality of accounts that transfer illegal money of unapproved money sources or a transfer path including a plurality of accounts that transfer game equipment of unapproved sources. In some scenarios, the game equipment of the unapproved source may be understood as illegal game equipment that may not be generated officially by a game platform but is generated privately by a player and not authenticated by the game platform. When the resource is money, the transfer path may be a path including a plurality of resource accounts through which illegal money is converted into legal money through a series of transfer operations.

Figure 1:
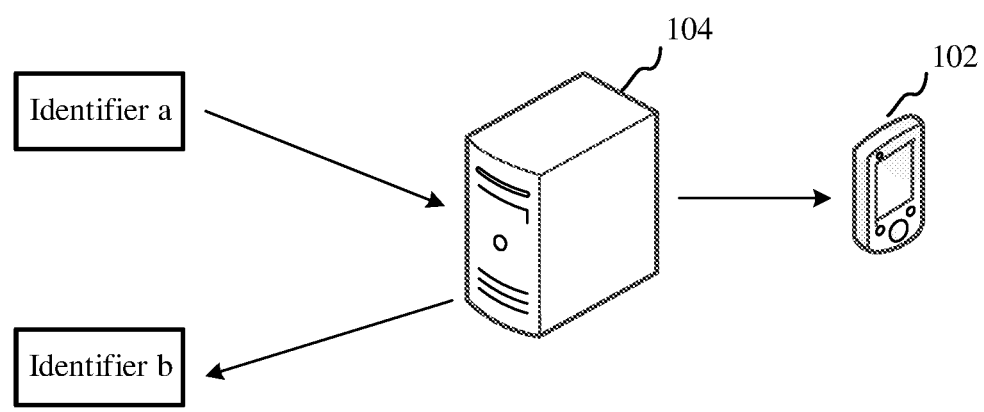
FIG. 1 is a diagram of an application environment of a resource transfer information detection method according to some examples.

As shown in FIG. 1, resource transfer may be performed between an identifier a and an identifier b based on a server 104. For example, if the identifier a is intended to transfer a resource to the identifier b, the identifier a may first transmit a to-be-transferred resource amount and identification information of the identifier b to the server 104. After receiving the resource amount and the identification information of the identifier b, which are transmitted by the identifier a, the server 104 allocates resources of the resource amount in resources the identifier a has to the identifier b, to complete a resource transfer operation from the identifier a to the identifier b. The server 104 stores resource transfer records between various resource transfer identifiers. When it is necessary to perform malicious resource transfer detection, for example, detect a transfer path of a large resource amount of an unauthenticated source, a resource transfer record may be obtained, and a resource transfer identifier set on which malicious resource transfer detection is to be performed is obtained based on the resource transfer record, so as to perform the resource transfer information detection method provided in the examples of the present subject matter to obtain a target resource transfer path. The server 104 may continue to further confirm whether the target resource transfer path is a malicious resource transfer path based on the target resource transfer path, for example, predict a probability that the path is a transfer path of a resource of an unauthenticated source based on information of a resource transfer behavior and the like in the target resource transfer path and a pre-trained resource transfer path detection model. The server may further transmit the detected target resource transfer path to a terminal 102, such that a user corresponding to the terminal 102 may perform manual confirmation based on the target resource transfer path.

The identifier includes but is not limited to a personal identifier, a merchant identifier, a bank card identifier, and the like. The same user may have both the identifier a and the identifier b. That is, the same user may have a plurality of identifiers. For example, Alice has a plurality of personal identifiers. For another example, Alice has a personal identifier, a merchant identifier, and the like. The user may perform the resource transfer operation by using the terminal. The terminal may be a personal computer, a notebook computer, a smartphone, a tablet computer, and a portable wearable device. The server may be implemented by an independent server or a server cluster including a plurality of servers.

Figure 2:
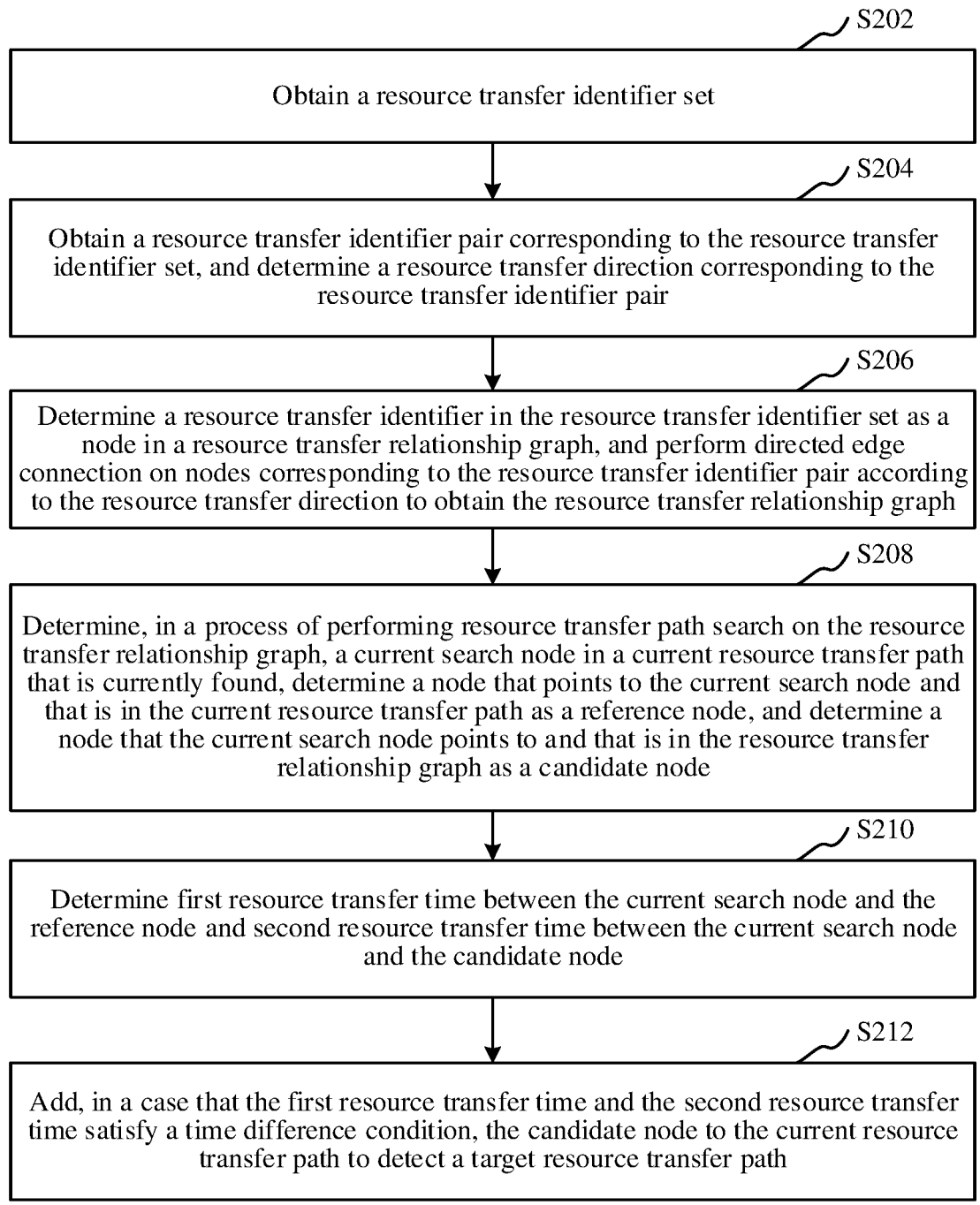
FIG. 2 is a schematic flowchart of a resource transfer information detection method according to some examples.

As shown in FIG. 2, a resource transfer information detection method is provided. Application of the method to the server in FIG. 1 is used as an example for description. The method includes the following steps:

Step S202: Obtain a resource transfer identifier set.

A resource transfer identifier represents a resource transfer participant of resource transfer. The resource transfer participant includes a resource transfer-in party and a resource transfer-out party. The resource transfer identifier may include a resource account, a user identifier, a merchant identifier, and the like. The resource account may be a bank card account, a third-party payment platform account, or the like. The user identifier may be a personal account for resource transfer. The merchant identifier may be a merchant identifier for resource transfer. The third-party payment platform account may be an identifier for resource transfer through a third-party payment platform. The identifier may be a social account. The resource transfer identifier set includes a plurality of resource transfer identifiers. The identifiers in the resource transfer identifier set may be of at least one type. That is, the identifier in the resource transfer identifier set is at least one of a personal identifier, a merchant identifier, and a bank card identifier. The same user may have a plurality of identifiers of the same or different types.

Transfer of a resource of an unauthenticated source may be malicious or illegal resource transfer. In the present subject matter, the resource transfer identifier set is obtained, and a path including identifiers that transfer a resource of an unauthenticated source, that is, a target resource transfer path including a plurality of identifiers, is detected from the resource transfer identifier set based on the resource transfer identifier set and a resource transfer relationship between the resource transfer identifiers. For example, the resource of the unauthenticated source is illegal money, detection may be detecting a path including capital accounts suspected of being involved in money laundering, to obtain a path sequentially including a plurality of identifiers, and the plurality of identifiers are regarded as a malicious gang.

Specifically, the server may obtain the plurality of resource transfer identifiers. The plurality of resource transfer identifiers form the resource transfer identifier set. In an example, the server may obtain a resource transfer record corresponding a resource transfer operation performed on a payment platform in some time past (for example, last t hours or last t days). Each resource transfer record includes information of a resource transfer-in party, a resource transfer-out party, a resource transfer amount, resource transfer time, and the like. The server may obtain the resource transfer identifier set according to the resource transfer-in party and the resource transfer-out party in the resource transfer record generated in some time part. In some other examples, the server may obtain a resource transfer record corresponding to a resource transfer operation performed in a preset time period past. For example, the preset time period is Feb. 1, 2021 to Jul. 10, 2021.

Step S204: Obtain a resource transfer identifier pair corresponding to the resource transfer identifier set, and determine a resource transfer direction corresponding to the resource transfer identifier pair.

Each resource transfer identifier pair includes two resource transfer identifiers with a resource transfer relationship in the resource transfer identifier set. The resource transfer relationship may include a resource transfer-out relationship and a resource transfer-in relationship. For example, there is a resource transfer record between the identifier a and the identifier b. The resource transfer record represents transfer-out of a resource from the identifier a to the identifier b or transfer-in of a resource from the identifier a to the identifier b. In this case, it is determined that there is a resource transfer relationship between the identifier a and the identifier b, and the identifier a and the identifier b may form a resource identifier pair.

The resource transfer direction is a flowing direction of resource transfer between the two identifiers forming the resource transfer identifier pair. The resource transfer direction may be a resource net transfer direction. The resource net transfer direction may be a resource net transfer-out direction or a resource net transfer-in direction. For example, a total resource amount transferred by the identifier a to the identifier b is 30,000, and a total resource amount transferred from the identifier b to the identifier a is 20,000. If the resource net transfer direction is the resource net transfer-out direction, a resource net transfer-out amount from the identifier a to the identifier b is 10,000, and a resource net transfer-out amount from the identifier b to the identifier a is −10,000. If the resource net transfer direction is the resource net transfer-in direction, a resource net transfer-in amount from the identifier b to the identifier a is −10,000, and a resource net transfer-in amount from the identifier a to the identifier b is 10,000.

When a plurality of resource transfers occur between the two identifiers of the resource transfer identifier pair, a resource net transfer amount between the identifiers is determined according to resource transfer amounts of the plurality of resource transfers between the two identifiers. For example, five resource transfers occur from the identifier a to the identifier b with a total resource amount of 30,000, and two resource transfers occur from the identifier b to the identifier a with a total resource amount of 20,000. If the resource net transfer direction is the resource net transfer-out direction, it may be determined according to the seven resource transfers between the identifier a and the identifier b that a resource net transfer-out amount from the identifier a to the identifier b is 10,000 and that a resource net transfer-out amount from the identifier b to the identifier a is −10,000. If the resource net transfer direction is the resource net transfer-in direction, it may be determined according to the seven resource transfers between the identifier a and the identifier b that a resource net transfer-in amount from the identifier a to the identifier b is −10,000 and that a resource net transfer-in amount from the identifier b to the identifier a is 10,000.

Specifically, the server uses the resource net transfer-out direction or the resource net transfer-in direction as the resource transfer direction. After the resource transfer identifier set is obtained, the resource transfer identifier pair (each resource transfer identifier pair includes a first identifier and a second identifier) with a resource transfer relationship is determined according to the resource transfer record. A resource net transfer amount of the resource transfer identifier pair in the resource transfer direction is determined according to a resource transfer amount of resource transfer-in or resource transfer-out of the resource transfer identifier pair.

In an example, after obtaining the resource transfer identifier set, the server determines the resource transfer identifier pair with the resource transfer relationship according to the resource transfer record, determines a resource net transfer-out amount of the resource transfer identifier pair according to a resource transfer-out amount of the resource transfer identifier pair, and determines a resource net transfer-out direction of the resource transfer identifier pair according to a magnitude relationship between the resource net transfer-out amount and zero, that is, determines whether the resource net transfer-out direction is from the first identifier to the second identifier or from the second identifier to the first identifier.

In an example, after obtaining the resource transfer identifier set, the server determines the resource transfer identifier pair with the resource transfer relationship according to the resource transfer record, determines a resource net transfer-in amount of the resource transfer identifier pair according to the resource transfer-in amount of the resource transfer identifier pair, and determines a resource net transfer-in direction of the resource transfer identifier pair according to a magnitude relationship between the resource net transfer-in amount and zero, that is, determines whether the resource net transfer-in direction is from the first identifier to the second identifier or from the second identifier to the first identifier.

An example in which the resource net transfer direction is the resource net transfer-out direction and the resource transfer amount is the resource net transfer-out amount is used for description.

Figure 4:
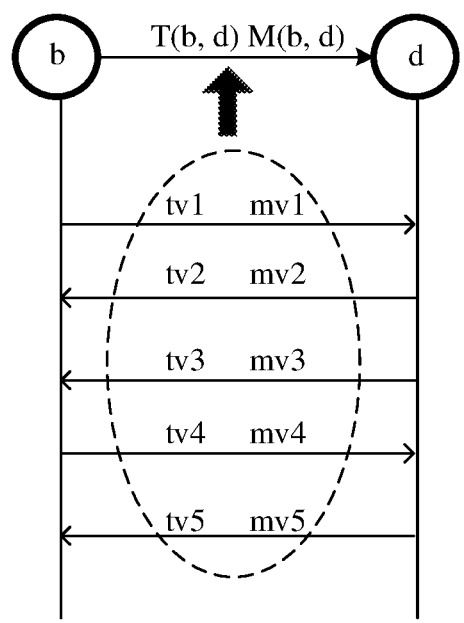
FIG. 4 is a schematic diagram of determining resource net transfer-out between nodes and time corresponding to resource net transfer-out according to some examples.

For example, as shown in FIG. 4, the server uses the resource net transfer-out direction as the resource transfer direction. After obtaining a resource transfer identifier set including an identifier a to an identifier k, the server determines according to resource transfer records that there are five resource transfers between an identifier b and an identifier d. The five resource transfers are respectively transfer of a resource amount mv1 from the identifier b to the identifier d, transfer of a resource amount mv2 from the identifier b to the identifier d, transfer of a resource amount mv3 from the identifier d to the identifier b, transfer of a resource amount mv4 from the identifier b to the identifier d, and transfer of a resource amount mv5 from the identifier d to the identifier b. A resource net transfer-out amount between the identifier b and the identifier d is denoted as M(b, d). The server may cancel and add the resource amounts (all greater than 0) of the five resource transfers to determine that the resource net transfer-out amount M(b, d) between the identifier b and the identifier d is mv1+mv2−mv3+mv4−mv5. Further, if the server determines that a value of M(b, d) is greater than 0, a resource transfer direction is from the identifier b to the identifier d. If M(b, d) is less than 0, a resource transfer direction is from the identifier d to the identifier b. If M(b, d) is equal to 0, it may be considered that the resource net transfer-out amount between the two identifiers is 0. In FIG. 4, an example in which M(b, d) is greater than 0 is used, and it is shown that the resource transfer direction is from the identifier b to the identifier d.

Figure 5:
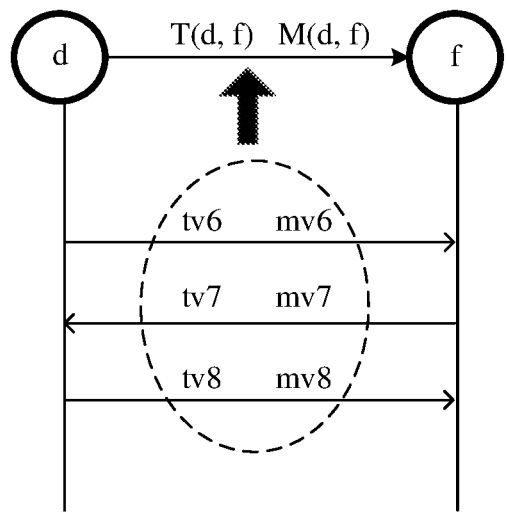
FIG. 5 is a schematic diagram of determining resource net transfer-out between nodes and time corresponding to resource net transfer-out according to some examples.

Similarly, as shown in FIG. 5, it is determined according to resource transfer records that there are three resource transfers between the identifier d and an identifier f. The three resource transfers are respectively transfer of a resource amount mv6 from the identifier d to the identifier f, transfer of a resource amount mv7 from the identifier f to the identifier d, and transfer of a resource amount mv8 from the identifier d to the identifier f. A resource net transfer-out amount between the identifier d and the identifier f is denoted as M(d, f). The server may cancel and add the resource amounts (all greater than 0) of the three resource transfers to determine that the resource net transfer-out amount M(d, f) between the identifier d and the identifier f is mv6−mv7+mv8. Further, if the server determines that a value of M(d, f) is greater than 0, the server may determine that a resource transfer direction between the identifiers d and f is from the identifier d to the identifier f. If M(d, f) is less than 0, a resource transfer direction is from the identifier f to the identifier d. If M(d, f) is equal to 0, it may be considered that the resource net transfer-out amount between the two identifiers is 0. In FIG. 5, an example in which M(d, f) is greater than 0 is used, and it is shown that the resource transfer direction is from the identifier d to the identifier f.

Step S206: Determine a resource transfer identifier in the resource transfer identifier set as a node in a resource transfer relationship graph, and perform directed edge connection on nodes corresponding to the resource transfer identifier pair according to the resource transfer direction to obtain the resource transfer relationship graph.

A directed edge is an undirected edge. Correspondingly, the formed resource transfer relationship graph may be referred to as a resource net transfer undirected graph. When the resource net transfer direction is the resource net transfer-out direction and the resource transfer amount is the resource net transfer-out amount, the resource net transfer undirected graph is a resource net transfer-out undirected graph. When the resource net transfer direction is the resource net transfer-in direction and the resource transfer amount is the resource net transfer-in amount, the resource net transfer undirected graph is a resource net transfer-in undirected graph. When the resource transfer relationship graph uses the resource net transfer-out undirected graph, a directed edge from the identifier a to the identifier b represents transfer of a resource net transfer-out amount greater than 0 from the identifier a to the identifier b. When the resource transfer relationship graph uses the resource net transfer-in undirected graph, a directed edge from the identifier a to the identifier b represents transfer of a resource net transfer-in amount greater than 0 from the identifier b to the identifier a.

In this step, after determining a resource transfer direction between two identifiers with a resource transfer relationship in the resource transfer identifier set, the server may determine each identifier as a node, and perform undirected edge connection on the nodes according to the resource transfer direction. For example, a resource transfer direction between the identifier b and the identifier d is from the identifier b to the identifier d, and then the two identifiers may be connected by using an undirected edge whose direction is from the identifier b to the identifier d. Similarly, for other two identifiers with a resource transfer relationship, undirected edge connection may be performed in the same manner. Therefore, a resource transfer relationship graph shown in FIG. 3(*a*) is obtained.

An example in which the resource transfer relationship graph is the resource net transfer-out undirected graph is used in the following example for description. It may be understood that an undirected edge from a node a to a node b in the resource net transfer-out undirected graph reflects that a resource flows out of the node a and then to the node b.

Step S208: Determine, in a process of performing resource transfer path search on the resource transfer relationship graph, a current search node in a current resource transfer path that is currently found, determine a node that points to the current search node and that is in the current resource transfer path as a reference node, and determine a node that the current search node points to and that is in the resource transfer relationship graph as a candidate node.

Specifically, the server may perform path search, that is, graph traversal, on the resource transfer relationship graph. Graph traversal means accessing, from a specific node in the graph, all nodes in the graph only once along edges in the graph according to a specific search mode. There are two graph traversal modes: breadth first search and depth first search. Breadth first search is search in which a path breadth takes precedence over a path depth. Depth first search is search in which the path depth takes precedence over the path breadth. In an example of the present subject matter, search in which the path depth takes precedence over the path breadth may be used for resource transfer path search.

Search in which the path depth takes precedence over the path breadth is described with reference to FIG. 3(a).

Depth first search is search in which the path depth takes precedence over the path breadth. Refer to FIG. 3(a). In a graph structure shown in FIG. 3(a), if a node currently found from a specific node is a node f, and an identifier that the node f points to includes a node c and a node h, one of the node c and the node h is selected as a found node. If the node c is selected, one of nodes that the node c points to is determined as a found node, that is, a node j is found. Then, one of nodes that the node j points to is determined as a found node, that is, a node k is found. In this search mode, the currently found node f points to the node c, the node c points to the node j, and then, the node k that the node j points to continues to be determined until an ending condition of depth first search is reached. It can be seen that depth first traversal is performed on the graph sequentially from adjacent nodes, that are not accessed, of the node f until all vertexes forming paths with the node f in the graph are accessed, and layer depths of nodes found before the ending condition is reached present an increasing trend. Such path search may be referred to as search in which the path depth takes precedence over the path breadth.

Search in which the path breadth takes precedence over the path depth is described with reference to FIG. 3(a).

Breadth first search is search in which the path breadth takes precedence over the path depth. Refer to FIG. 3(a). In a graph structure shown in FIG. 3(a), if a node currently found from a specific node is a node f, and a node that the node f points to includes a node c and a node h, one of the nodes c and h is selected as a found node. If the node c is selected, one of nodes that the node c points to is determined as a found node, that is, a node j is found. Then, the other node h that the node f points to is determined as a found node, and one of nodes that the node h points to is determined as a found node, that is, a node g is found. In this search mode, after nodes that all nodes of the same layer point to are determined, a next layer is entered, and nodes that all nodes of the next layer point to are determined. Such path search mainly based on the path breadth is referred to as search in which the path breadth takes precedence over the path depth. It can be seen that breadth first search is a hierarchical search process.

The current resource transfer path is a path including nodes that are found based on path search and that are connected by undirected edges in the resource transfer relationship graph, and is a resource transfer path currently in searching. The currently found node may be referred to as the current search node. The reference node is a node that points to the current search node and that is in the current resource transfer path. The candidate node is a node that the current search node points to and that is in the resource transfer relationship graph.

Figure 3A:
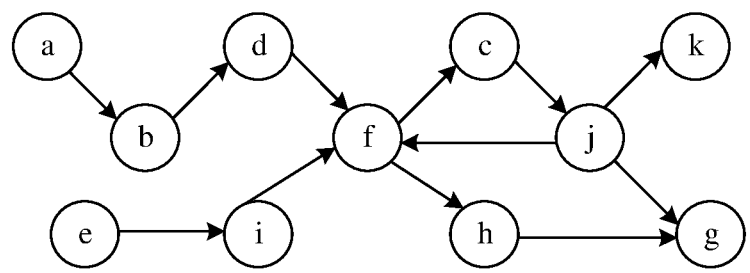
FIG. 3(a) is a schematic diagram of a resource transfer relationship graph according to some examples.
Figure 3B:
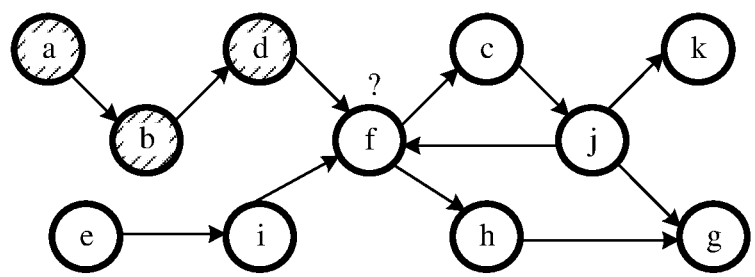
FIG. 3(b) is a schematic diagram of performing resource transfer path search on a resource transfer relationship graph according to some examples.

For example, after obtaining the resource transfer relationship graph shown in FIG. 3(a), the server may perform resource transfer path search on the resource transfer relationship graph according to a path depth first mode. As shown in FIG. 3(b), if the currently found resource transfer path is a→b→d, the current search node is the node d. In this case, the node b that points to the current search node d and that is in the current resource transfer path a→b→d is determined as the reference node, and the node f that the current search node d points to and that is in the resource transfer relationship graph is determined as the candidate node, so as to determine, through a subsequent step, whether the node f may be added to the current resource transfer path.

Step S210: Determine first resource transfer time between the current search node and the reference node and second resource transfer time between the current search node and the candidate node.

The first resource transfer time is determined by integrating occurrence time of a plurality of resource transfers between the current search node and the reference node, and is used for representing transfer time corresponding to a resource net transfer amount between the current search node and the reference node. The second resource transfer time is determined by integrating occurrence time of a plurality of resource transfers between the current search node and the candidate node, and is used for representing transfer time corresponding to a resource net transfer amount between the current search node and the candidate node.

Determining of the first resource transfer time is used as an example to describe some possible implementations.

The first resource transfer time may be an average value of the occurrence time of the plurality of resource transfers between the current search node and the reference node. The occurrence time may be a timestamp sequentially increasing according to resource transfer time. As shown in FIG. 4, if the current search node is the identifier d, the reference node is the identifier b, there are five resource transfers between the identifier b and the identifier d, and the five resource transfers are respectively transfer of the resource amount mv1 from the identifier b to the identifier d at a moment tv1, transfer of the resource amount mv2 from the identifier b to the identifier d at a moment tv2, transfer of the resource amount mv3 from the identifier d to the identifier b at a moment tv3, transfer of the resource amount mv4 from the identifier b to the identifier d at a moment tv4, and transfer of the resource amount mv5 from the identifier d to the identifier b at a moment tv5, the server may determine an average value of tv1, tv2, tv3, tv4, and tv5 as the first resource transfer time. The first resource transfer time may be denoted as T(b, d).

Similarly, the second resource transfer time may be determined in the foregoing manner. Elaborations are omitted herein.

Step S212: Add, when the first resource transfer time and the second resource transfer time satisfy a time difference condition, the candidate node to the current resource transfer path to detect a target resource transfer path.

A difference between the two pieces of resource transfer time may be represented by a difference value between the two pieces of resource transfer time, or by a ratio of the two pieces of resource transfer time. The time difference condition is a time difference condition of flowing of a target resource from the reference node sequentially to the current search node and the candidate node. The target resource may be a resource of an unauthenticated source. A greater time difference between the first resource transfer time and the second resource transfer time represents a more obvious chronological order of resource transfer between the current search node and the reference node and resource transfer between the current search node and the candidate node. In a chronological order, the target resource is more likely to flow from the reference node sequentially to the current search node and the candidate node. That is, the reference node may be a source node of the target resource for the current search node, and the candidate node may be a destination node of the target resource for the current search node. It may be understood that there may be a plurality of target resource transfer paths. The target resource transfer path is a path finally obtained at the end of search continuously performed on the resource transfer relationship graph based on the current resource transfer path. The target resource transfer path is a recognized path on which there may be malicious resource transfer. One or more target resource transfer paths may be obtained from the resource transfer relationship graph by performing the method in this example of the present subject matter.

For example, refer to FIG. 3(b). If the current resource transfer path is a→b→d, the current search node is the node d, the reference node is the node b, and the candidate node is the node f. After the server obtains the first resource transfer time T(b, d) between the current search node and the reference node and the second resource transfer time T(d, f) between the current search node and the candidate node, if the first resource transfer time T(b, d) is earlier than the second resource transfer time T(d, f), it is determined that the first resource transfer time and the second resource transfer time satisfy the time difference condition, and the node f is added to the current resource transfer path a→b→d to update the current resource transfer path to a→b→d→f. Then, the server may perform step S210 to step S212 by taking, in the current resource transfer path a→b→d→f, the node f as the current search node, the node d as the reference node of the current search node f, and the node c or the node h that the current search node f points to and that is in the resource transfer relationship graph as the candidate node, to determine whether to add the node c or h to which the node f points to the current resource transfer path a→b→d→f to update the current resource transfer path to a→b→d→f→c or a→b→d→f→h. Depth first search may be continuously performed. Depth first search for this path may be stopped when at least one of the following termination conditions is satisfied:

(1) a length of the currently found resource transfer path reaches a preset maximum length;
(2) an out-degree of the current search node is equal to 0, that is, there is no candidate node corresponding to the current search node; and
(3) the candidate node that the current search node points to does not include a node satisfying a condition of adding to the current resource transfer path.

In the resource transfer information detection method, the resource transfer relationship graph is constructed based on the resource transfer relationship and the resource transfer direction between the resource transfer identifiers. The resource transfer relationship graph may accurately reflect a resource transfer situation between the resource transfer identifiers, and is favorable for accurately recognizing a transfer path of a resource of an unauthenticated source from massive resource transfers and improving path recognition efficiency. In addition, in a process in which resource transfer path search is performed on the resource transfer relationship graph, when the first resource transfer time between the current search node and the reference node and the second resource transfer time between the current search node and the candidate node satisfy the time difference condition, the candidate node is added to the current resource transfer path, to indicate that the target resource flows from the reference node sequentially to the current node and the candidate node in the chronological order, so that a flowing direction of the target resource may be reflected accurately. Nodes are sequentially added in this manner, thereby accurately recognizing the target resource transfer path of the target resource. This improves path recognition accuracy.

An out-degree of each node in the resource transfer relationship graph may be determined during resource transfer path search. The out-degree is a quantity of edges from the node to other nodes. The server may determine a node whose out-degree is greater than 0 as a starting node for path search.

After performing path search from the starting node to obtain a target resource transfer path, the server may determine nodes in the target resource transfer path. If a plurality of nodes point to a specific node in the target resource transfer path, that is, there are a plurality of incoming edges for a specific node, a sub-path starting from the node in the target resource transfer path is denoted as an attribute of the node, such that the sub-path may be directly obtained when the node is found next time, to obtain another target resource transfer path including the sub-path. Therefore, search time is saved, and search efficiency is improved. For example, refer to FIG. 3(b). A target resource transfer path a→b→d→f→c→j→k is found from the node a. Two nodes points to the node f: the node d and a node i. In this case, the server records a sub-path f→c→j→k starting from the node f. When the candidate node f is found by next path search from a node e, that is, the current resource transfer path is e→i, the sub-path f→c→j→k corresponding to the candidate node f may be directly obtained, and the sub-path is concatenated after the current resource transfer path to obtain another target resource transfer path e→i→f→c→j→k. An attribute of the candidate node is directly read to concatenate a corresponding sub-path, without continuous traversal. Therefore, the path search efficiency is improved.

The operation of adding, when the first resource transfer time and the second resource transfer time satisfy a time difference condition, the candidate node to the current resource transfer path includes: obtaining a path attribute identifier corresponding to the candidate node when the first resource transfer time and the second resource transfer time satisfy the time difference condition; and obtaining, based on the path attribute identifier, a sub-path starting from the candidate node, and concatenating the sub-path to the current resource transfer path to obtain the target resource transfer path.

Figure 3C:
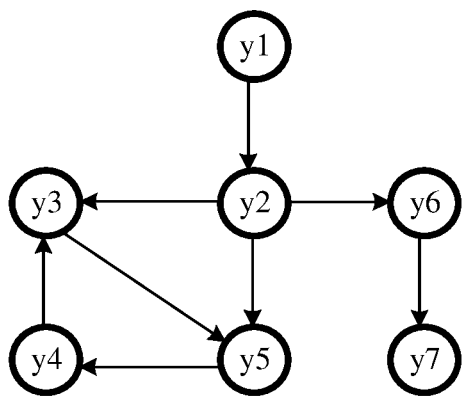
FIG. 3(c) is a schematic diagram of a resource transfer relationship graph according to some examples.

Every time when adding a node to the current resource transfer path in the process of performing path search from the starting node, the server may record the node, that is, record nodes (identifiers) in the current resource transfer path. If the current search node is in the current resource transfer path, it indicates that the current search node has been accessed, and a node loop formed by nodes is encountered. In this case, the server stops access, determines the current resource transfer path as a target resource transfer path obtained by current search, and starts next path search. Refer to FIG. 3(c). In FIG. 3(c), nodes y3, y5, and y4 form a node loop. When the current resource transfer path obtained by access is y1→y2→y3→y5→y4, the node y4 is the current search node, and the candidate node corresponding to the node y4 is the node y3. Since the candidate node y3 is in the current resource transfer path, access is stopped, and the obtained target resource transfer path is y1→y2→y3→y5→y4. When the current resource transfer path obtained by access is y1→y2→y5→y4→y3, the node y3 is the current search node, and the candidate node corresponding to the node y3 is the node y5. Since the candidate node y5 is in the current resource transfer path, access is stopped, and the obtained target resource transfer path is y1→y2→y5→y4→y3. In this way, infinitely cyclic node access and computing resource wastes may be avoided.

The first resource transfer time between the current search node and the reference node may be determined in the following manner: obtaining a resource transfer record set between the current search node and the reference node; obtaining resource transfer time and a resource transfer value in each resource transfer record; determining a time weight corresponding to the resource transfer time based on the resource transfer value, the time weight is in positive correlation with the resource transfer value; and performing weighted calculation on the resource transfer time in the resource transfer record set based on the time weight corresponding to the resource transfer time to obtain the first resource transfer time between the current search node and the reference node.

The resource transfer record set includes a plurality of resource transfer records. Each resource transfer record corresponds to each resource transfer between the current search node and the reference node. Each resource transfer record may include a resource transfer value and resource transfer time of each resource transfer. The resource transfer value of each resource transfer is a resource transfer amount. The resource transfer time corresponding to each resource transfer is occurrence time of each resource transfer, for example, the occurrence time tv1, tv2, tv3, tv4, and tv5 of the various resource transfers between the identifiers b and d.

A weight assigned to the occurrence time of each resource transfer is in positive correlation with the resource transfer amount corresponding to each resource transfer. For example, for the occurrence time tv1, tv2, tv3, tv4, and tv5 of the various resource transfers between the identifier b and the identifier d, if resource transfer amounts corresponding to the resource transfers are sorted in an ascending order as mv1, mv4, mv3, mv2, and mv5, based on the positive correlation, weights assigned to the occurrence time tv1, tv2, tv3, tv4, and tv5 of the various resource transfers are sorted in an ascending order as wv1, wv4, wv3, wv2, and wv5.

Specifically, after obtaining the weight corresponding to the occurrence time of each resource transfer, the server may perform weighted calculation on the occurrence time of each resource transfer, that is, wv1×tv1+wv2×tv2+wv3×tv3+wv4×tv4+wv5×tv5, and determine a result obtained through weighted calculation as the first resource transfer time between the current search node and the reference node.

In the foregoing manner, the weight assigned to the occurrence time of each resource transfer is determined based on the positive correlation between the resource transfer value of each resource transfer and the occurrence time of each resource transfer, and weighted calculation is performed. Therefore, the first resource transfer time focuses more on reflecting occurrence time of transfer of a large resource amount in a plurality of resource transfers between the current search node and the reference node, and accuracy of searching for the target resource transfer path is improved.

The operation of determining a time weight corresponding to the resource transfer time based on the resource transfer value includes: performing sum calculation on resource transfer values in the resource transfer record set to obtain a resource transfer statistical value; and calculating a ratio of the resource transfer value to the resource transfer statistical value, and determining the ratio as the time weight corresponding to the resource transfer time.

The resource transfer statistical value is a sum value of resource transfer amounts corresponding to the various resource transfers between the current search node and the reference node, and may also be referred to as a total resource transfer amount.

The foregoing example is still described by taking d as the current search node and b as the reference node. As shown in FIG. 4, the resource transfer amounts corresponding to the various resource transfers between the identifier b and the identifier d are mv1, mv2, mv3, mv4, and mv5. The server may determine mv1+mv2+mv3+mv4+mv5 as the resource transfer statistical value. Then, the server may calculate ratios of the resource transfer amounts corresponding to the various resource transfers to the resource transfer statistical value:

mv1/(mv1+mv2+mv3+mv4+mv5), mv2/(mv1+mv2+mv3+mv4+mv5),
mv3/(mv1+mv2+mv3+mv4+mv5), mv4/(mv1+mv2+mv3+mv4+mv5), and
mv5/(mv1+mv2+mv3+mv4+mv5). These ratios are sequentially determined as the weights wv1, wv2, wv3, wv4, and wv5 assigned to tv1, tv2, tv3, tv4, and tv5.

In the foregoing manner, the ratio of the resource transfer amount corresponding to each resource transfer to the total resource transfer amount is determined as the weight assigned to the occurrence time of each resource transfer. Therefore, the first resource transfer time reflects, to a greater extent, occurrence time of transfer of a large resource amount in a plurality of resource transfers between the current search node and the reference node, and accuracy of searching for the target resource transfer path is further improved.

The foregoing manner in which the first resource transfer time between the reference node and the current search node is determined may be applied to the second resource transfer time between the current search node and the candidate node.

The first resource transfer time is first last resource transfer time from the reference node to the current search node, and the second resource transfer time is second initial resource transfer time from the current search node to the candidate node. The operation of determining that the first resource transfer time and the second resource transfer time satisfy a time difference condition includes: determining a time sequence between the first resource transfer time and the second resource transfer time; and determining, when the time sequence indicates that the first resource transfer time is earlier than the second resource transfer time, that the first resource transfer time and the second resource transfer time satisfy the time difference condition; or determining, when the time sequence indicates that the first resource transfer time is later than the second resource transfer time and a difference between the first resource transfer time and the second resource transfer time is less than a preset time threshold, that the first resource transfer time and the second resource transfer time satisfy the time difference condition.

The first resource transfer time is the first last resource transfer time from the reference node to the current search node. For example, if the current search node is d, and the reference node is b, as shown in FIG. 4, there are five resource transfers between the node b and the node d, the five resource transfers include two resource transfers from the node b to the node d, and occurrence time of the last of the two resource transfers is tv4. In this case, tv4 may be determined as the first resource transfer time.

The second resource transfer time is the second initial resource transfer time from the current search node to the candidate node. For example, if the current search node is d, and the candidate node is f, as shown in FIG. 5, there are three resource transfers between the node d and the node f, the three resource transfers include two resource transfers from the node d to the node f, and occurrence time of the first of the two resource transfers is tv6. In this case, tv6 may be determined as the second resource transfer time.

The time sequence is used for representing a chronological order of the first resource transfer time and the second resource transfer time. When the first resource transfer time is earlier than the second resource transfer time, the server may determine that the first resource transfer time and the second resource transfer time satisfy the time difference condition. When the time sequence indicates that the first resource transfer time is later than the second resource transfer time, and the difference between the first resource transfer time and the second resource transfer time is less than the preset time threshold, that is, an absolute value of the difference between the first resource transfer time and the second resource transfer time is less than the preset time threshold, the server may determine that the first resource transfer time and the second resource transfer time satisfy the time difference condition.

In the foregoing manner, the occurrence time of the last of the plurality of resource transfers from the reference node to the current search node is determined as the first resource transfer time, and the occurrence time of the first of the plurality of resource transfers from the current search node to the candidate node is determined as the second resource transfer time. The time difference between the two pieces of resource transfer time represents whether the occurrence time of the plurality of resource transfers between the reference node and the current search node overlaps that of the plurality of resource transfers between the current search node and the candidate node. If the occurrence time of the plurality of resource transfers between the reference node and the current search node does not overlap that of the plurality of resource transfers between the current search node and the candidate node, it is determined that there is an obvious chronological order of a resource net transfer between the reference node and the current search node and a resource net transfer between the current search node and the candidate node, and a probability that a resource transferred in continuous resource transfers from the reference node to the current search node and then to the candidate node is an illegal resource is greater. Therefore, accuracy of recognizing a transfer path of a resource of an unauthenticated source is improved.

The operation of determining that the first resource transfer time and the second resource transfer time satisfy a time difference condition includes: determining a time sequence between the first resource transfer time and the second resource transfer time; obtaining a first time difference value between the first resource transfer time and the second resource transfer time when the time sequence indicates that the first resource transfer time is later than the second resource transfer time; obtaining first initial resource transfer time from the reference node to the current search node, and obtaining second last resource transfer time from the current search node to the candidate node; obtaining a second time difference value between the second last resource transfer time and the first initial resource transfer time; and calculating a time ratio between the first time difference value and the second time difference value, and determining, when the time ratio is less than or equal to a preset ratio threshold, that the first resource transfer time and the second resource transfer time satisfy the time difference condition.

The first initial resource transfer time is the occurrence time of the first of the plurality of resource transfers from the reference node to the current search node. The second last resource transfer time is the occurrence time of the last of the plurality of resource transfers from the current search node to the candidate node.

Figure 6A:
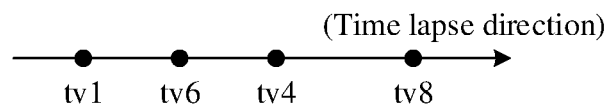
FIG. 6(a) is a schematic diagram of determining a chronological order corresponding to resource net transfer-out between nodes according to some examples.

An example in which the reference node is b, the current search node is d, and the candidate node is f is used to describe the foregoing operations with reference to FIG. 4 and FIG. 5. FIG. 6(a) is a schematic diagram of determining a chronological order of the occurrence time of the plurality of resource transfers from the reference node to the current search node and the occurrence time of the plurality of resource transfers from the current search node to the candidate node. The occurrence time of the plurality of resource transfers from the reference node b to the current search node d includes tv1 and tv4. The occurrence time of the plurality of resource transfers from the current search node d to the candidate node f includes tv6 and tv8. A chronological order of the occurrence time is tv1, tv6, tv4, and tv8, as shown in FIG. 6(a).

Referring to FIG. 6(a) and the foregoing definitions about the first resource transfer time and the first initial resource transfer time, a meaning of each symbol may be clarified. The first resource transfer time is the occurrence time of the last of the plurality of actual resource transfers from the reference node b to the current search node d, that is, tv4. The first initial resource transfer time is the occurrence time of the first of the plurality of resource transfers from the reference node b to the current search node d, that is, tv1. The second resource transfer time is the occurrence time of the first of the plurality of resource transfers from the current search node d to the candidate node f, that is, tv6. The second last resource transfer time is the occurrence time of the last of the plurality of resource transfers from the current search node d to the candidate node f, that is, tv8. FIG. 6(a) shows a case in which the first resource transfer time is later than the second resource transfer time, that is, tv4>tv6. If the first resource transfer time is later than the second resource transfer time, the server may determine tv4−tv6 as the first time difference value. Similarly, the server may determine tv8−tv1 as the second time difference value, and obtain the time ratio (tv4−tv6)/(tv8−tv1) between the first time difference value and the second time difference value.

As shown in FIG. 6(a), a higher time ratio (tv4−tv6)/(tv8−tv1) represents a higher ratio of an overlapping time period (that is, tv6 to tv4) between an occurrence time period (that is, tv1 to tv4) of the plurality of resource transfers from the reference node b to the current search node d and an occurrence time period (that is, tv6 to tv8) of the plurality of resource transfers from the current search node d to the candidate node f to a total occurrence time period (that is, tv1 to tv8), and also represents lower obviousness of the chronological order of the resource net transfer from the reference node b to the current search node d and the resource net transfer from the current search node d to the candidate node f. A lower time ratio (tv4−tv6)/(tv8−tv1) represents a lower ratio of an overlapping time period (that is, tv6 to tv4) between an occurrence time period (that is, tv1 to tv4) of the plurality of resource transfers from the reference node to the current search node and an occurrence time period (that is, tv6 to tv8) of the plurality of resource transfers from the current search node to the candidate node to a total occurrence time period (that is, tv1 to tv8), and also represents higher obviousness of the chronological order of the resource net transfer from the reference node b to the current search node d and the resource net transfer from the current search node d to the candidate node f. If the preset ratio threshold is 0.5, and the time ratio (tv4−tv6)/(tv8−tv1) is less than or equal to 0.5, the server may determine that the first resource transfer time and the second resource transfer time satisfy the time difference condition, and add the candidate node f to the current resource transfer path a→b→d.

In the foregoing manner, when the occurrence time of the last of the plurality of resource transfers from the reference node to the current search node is later than that of the first of the plurality of resource transfers from the current search node to the candidate node, obviousness of the chronological order of the resource net transfers of the node pairs is determined based on the ratios of the overlapping time periods to the total occurrence time period as a condition to be satisfied for addition of the candidate node to the target resource transfer path. This improves recognition accuracy of searching for the target resource transfer path.

The operation of determining that the first resource transfer time and the second resource transfer time satisfy a time difference condition includes: determining a time sequence between the first resource transfer time and the second resource transfer time; and determining directly, when the time sequence indicates that the first resource transfer time is earlier than the second resource transfer time, that the first resource transfer time and the second resource transfer time satisfy the time difference condition.

Figure 6B:
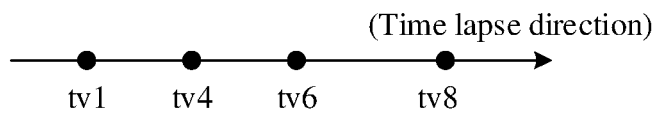
FIG. 6(b) is a schematic diagram of determining a chronological order corresponding to resource net transfer-out between nodes according to some examples.

An example in which the reference node is b, the current search node is d, and the candidate node is f is used to describe the foregoing operations with reference to FIG. 4 and FIG. 5. FIG. 6(b) is a schematic diagram of determining a chronological order of the occurrence time of the plurality of resource transfers from the reference node to the current search node and the occurrence time of the plurality of resource transfers from the current search node to the candidate node. The occurrence time of the plurality of resource transfers from the reference node b to the current search node d includes tv1 and tv4. The occurrence time of the plurality of resource transfers from the current search node d to the candidate node f includes tv6 and tv8. A chronological order of the occurrence time is tv1, tv4, tv6, and tv8, as shown in FIG. 6(b).

Referring to FIG. 6(b) and the foregoing definitions about the first resource transfer time and the first initial resource transfer time, a meaning of each symbol may be clarified. The first resource transfer time is the occurrence time of the last of the plurality of actual resource transfers from the reference node b to the current search node d, that is, tv4. The first initial resource transfer time is the occurrence time of the first of the plurality of resource transfers from the reference node b to the current search node d, that is, tv1. The second resource transfer time is the occurrence time of the first of the plurality of resource transfers from the current search node d to the candidate node f, that is, tv6. The second last resource transfer time is the occurrence time of the last of the plurality of resource transfers from the current search node d to the candidate node f, that is, tv8. FIG. 6(b) shows a case in which the first resource transfer time is earlier than the second resource transfer time, that is, tv4<tv6.

tv4<tv6 represents no overlapping time period between an occurrence time period (that is, tv1 to tv4) of the plurality of resource transfers from the reference node b to the current search node d and an occurrence time period (that is, tv6 to tv8) of the plurality of resource transfers from the current search node d to the candidate node f, and also represents higher obviousness of the chronological order of the resource net transfer from the reference node b to the current search node d and the resource net transfer from the current search node d to the candidate node f. It may be determined that the first resource transfer time and the second resource transfer time satisfy the time difference condition, and the candidate node f may be added to the current resource transfer path a→b→d.

In the foregoing manner, when the occurrence time of the last of the plurality of resource transfers from the reference node to the current search node is earlier than that of the first of the plurality of resource transfers from the current search node to the candidate node, it is determined that obviousness of the chronological order of the resource net transfers of the node pairs is high. This improves recognition accuracy of transfer path search for a resource of an unauthenticated source.

The operation of adding, when the first resource transfer time and the second resource transfer time satisfy a time difference condition, the candidate node to the current resource transfer path to obtain a target resource transfer path includes: obtaining a first resource transfer amount of transfer from the reference node to the current search node and a second resource transfer amount of transfer from the current search node to the candidate node; and adding, when the first resource transfer time and the second resource transfer time satisfy the time difference condition and a resource amount difference between the first resource transfer amount and the second resource transfer amount is less than a preset amount difference, the candidate node to the current resource transfer path to obtain the target resource transfer path.

The first resource transfer amount is a resource transfer amount from the reference node to the current search node. The second resource transfer amount is a resource transfer amount from the current search node to the candidate node. The resource amount difference between the first resource transfer amount and the second resource transfer amount may reflect relative magnitudes of the first resource transfer amount and the second resource transfer amount.

An example in which the reference node is b, the current search node is d, and the candidate node is f is used to describe the foregoing operations. The first resource transfer amount is M(b, d), and the second resource transfer amount is M(d, f). When any method described in the other examples is used to determine that the first resource transfer time and the second resource transfer time satisfy the time difference condition, if the resource amount difference between M(b, d) and M(d, f) is less than the preset amount difference, that is, M(b, d) is approximate to M(d, f), the server may add the candidate node f to the current resource transfer path a→b→d to obtain a new current resource transfer path a→b→d→f.

In the foregoing manner, whether to add the candidate node to the current resource transfer path is determined in combination with the resource transfer time difference and the resource amount difference, to ensure that the candidate node is a resource destination node for the current search node. Therefore, the recognition accuracy of searching for the target resource transfer path is improved.

Determining of the resource amount difference between the first resource transfer amount and the second resource transfer amount includes: calculating a resource amount ratio between the first resource transfer amount and the second resource transfer amount; and determining the resource amount ratio as the resource amount difference. Further, when determining that the resource amount ratio is within a preset ratio range, for example, is greater than a first threshold and less than a second threshold, the server determines that the resource amount difference between the first resource transfer amount and the second resource transfer amount is less than the preset amount difference.

The first threshold and the second threshold are used for determining whether the first resource transfer amount is approximate to the second resource transfer amount. The first threshold and the second threshold may be numerical values approximate to 1. For example, the first threshold is 1.1, and the second threshold is 1.3. The first threshold may be a numerical value less than and approximate to 1, for example, 0.8. The second threshold may be a numerical value greater than and approximate to 1, for example, 1.1

An example in which the reference node is b, the current search node is d, the candidate node is f, the first threshold is 0.8, and the second threshold is 1.1 is used to describe the foregoing operations. The first resource transfer amount is $M(b, d)$, and the second resource transfer amount is $M(d, f)$. When any method described in the other examples is used to determine that the first resource transfer time and the second resource transfer time satisfy the time difference condition, if the resource amount ratio $M(b, d)/M(d, f)$ is greater than 0.8 and less than 1.1, it is considered that $M(b, d)$ is approximate to $M(d, f)$, and the candidate node f may be added to the current resource transfer path a→b→d to obtain a new current resource transfer path a→b→d→f.

In the foregoing manner, the resource amount ratio is determined as a degree of approximation of the two resource transfer amounts. In this way, the candidate node is added to the current resource transfer path when the two resource transfer amounts are approximate, to ensure that the candidate node is a resource destination node for the current search node. Therefore, the recognition accuracy of searching for the target resource transfer path is improved.

The operation of determining a current search node in a current resource transfer path that is currently found includes: determining a starting node in nodes in the resource transfer relationship graph; and forming, when a resource transfer amount from the starting node to a node that the starting node points to is greater than or equal to a resource transfer amount threshold, the current resource transfer path based on the starting node and the node that the starting node points to, and determining the node that the starting node points to as the current search node.

The starting node in the resource transfer relationship graph is required to satisfy at least one of the following conditions.

(1) An out-degree of the node is greater than 0, and an in-degree of the node is less than or equal to a preset threshold. The preset threshold is, for example, 0. The in-degree is a quantity of edges pointing to the node. For example, in FIG. 3(a), in-degrees of the node a and the node e are both 0, so that the nodes a and e satisfy this condition, and may be determined as starting nodes.

Figure 7:
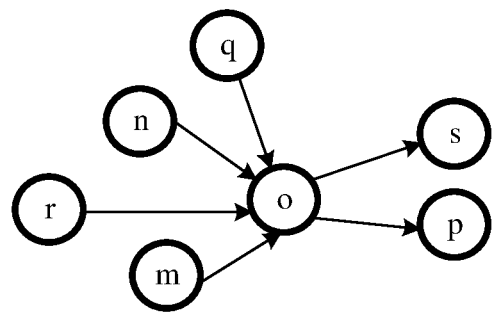
FIG. 7 shows a resource net transfer-out undirected graph between a plurality of nodes according to some examples.

(2) A ratio of a total resource transfer-in amount of the node to a total resource transfer-out amount of the node is less than a preset ratio. The total resource transfer-in amount is a total resource amount transferred by all nodes pointing to the node to the node. The total resource transfer-out amount is a total resource amount transferred by the node to all nodes that the node points to. When the ratio of the total resource transfer-in amount of the node to the total resource transfer-out amount of the node is less than the preset ratio, it indicates that the total resource transfer-in amount of the node and the total resource transfer-out amount of the node are not approximate, and the total resource transfer-in amount is less than the total resource transfer-out amount. That is, the total resource transfer-in amount of the node is far less than a total resource net transfer-out amount, and the node may be determined as the starting node. As shown in FIG. 7, when whether a total resource transfer-in amount of a node o is far less than a total resource transfer-out amount of the node is determined, since all nodes pointing to the node o is q, n, r, and m, a sum value of resource amounts transferred by the nodes q, n, r, and m to the node o may be determined as the total resource transfer-in amount of the node o, that is, $M(q, o)+M(n, o)+M(r, o)+M(m, o)$. Since all nodes that the node o points to are p and s, a sum value of resource transfer-out amounts from the node o to the node p and the node s may be determined as the total resource transfer-out amount of the node o, that is, $M(o, p)+M(o, s)$. If the total resource transfer-in amount $M(q, o)+M(n, o)+M(r, o)+M(m, o)$ is far less than the total resource transfer-out amount $M(o, p)+M(o, s)$, that is, a ratio is less than the preset ratio, the node o may be determined as a starting node for path search in the resource transfer relationship graph. More specifically, if $M(q, o)+M(n, o)+M(r, o)+M(m, o)<k\times[M(o, p)+M(o, s)]$, k is any numerical value from 0.1 to 0.3, it may be determined that the total resource transfer-in amount is far less than the total resource transfer-out amount.

Specifically, as shown in FIG. 3(a), the node e is used as an example to describe the foregoing operations.

If the in-degree of the node e is 0, the node e points to only a node i, and there is no incoming edge. A total resource transfer-in amount corresponding to the node e is 0, and a total resource transfer-out amount from the node e to the node i is $M(e, i)$. If $M(e, i)$ is far greater than 0, the node e satisfies the foregoing condition (1), and may be determined as a starting node. A current resource transfer path e→i is formed based on the node e and the node i. The node i is determined as the current search node, the node e is determined as the reference node, and the node f that the node i points to is determined as the candidate node. Whether to add the node f to the current resource transfer path e→i is determined according to obviousness of a chronological order of resource transfer time from the node e to the node i and resource transfer time from the node i to the node f and a degree of approximation of $M(e, i)$ and $M(i, f)$.

In the foregoing manner, a node satisfying a preset condition in the resource transfer relationship graph is determined as the starting node for current path search, and the current resource transfer path and the current search node are obtained according to a relative magnitude of a resource transfer-out amount from the starting node to the point that the starting node points to, thereby ensuring normal search for a transfer path of a resource of an unauthenticated source.

Figure 8:
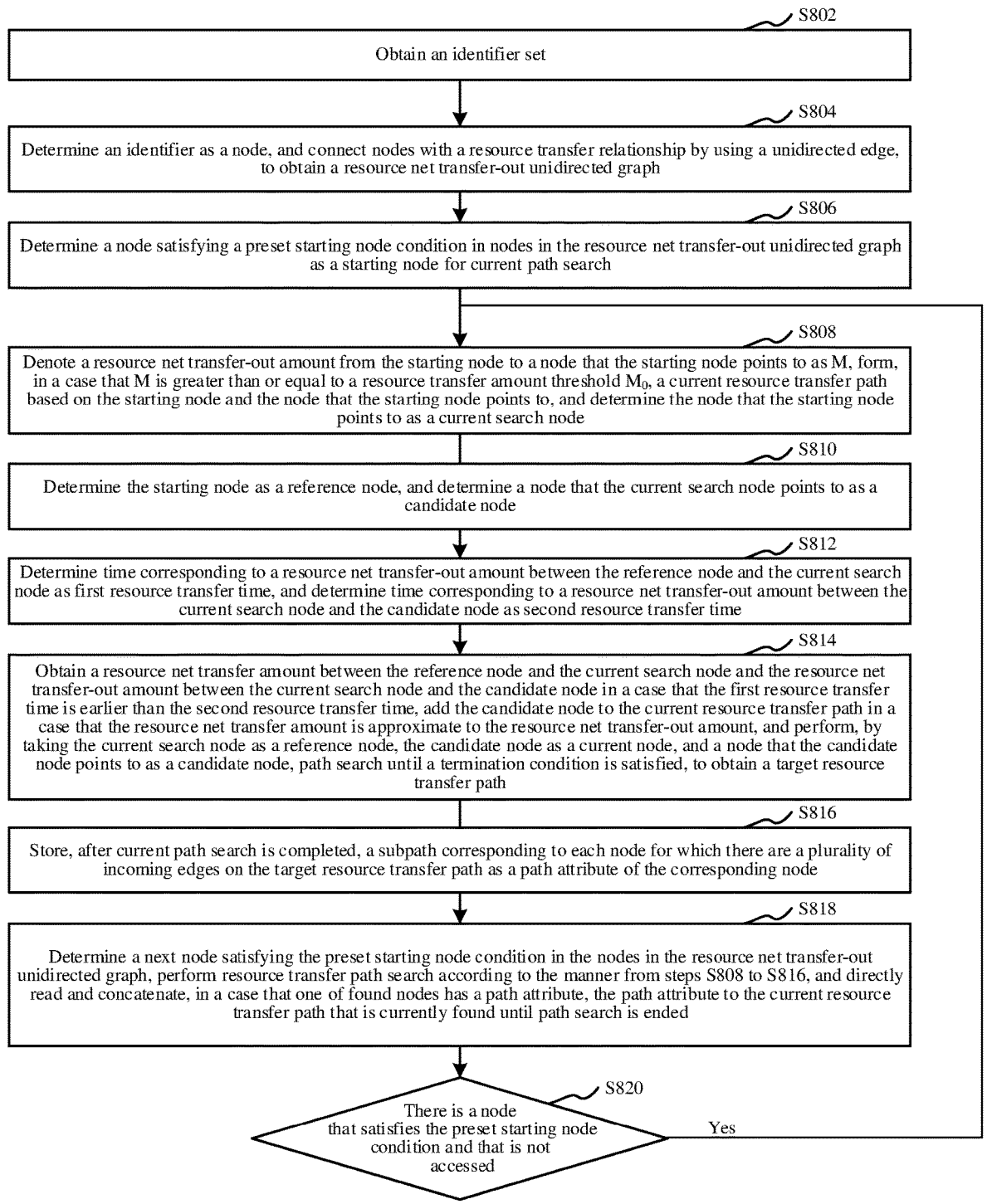
FIG. 8 is a schematic flowchart of a resource transfer information detection method according to some examples.

The following describes an application example of the resource transfer information detection method of the present subject matter in detail with reference to FIG. 8, to understand the method better. In this application example, the resource transfer identifier is referred to as an identifier.

Step S802: Obtain an identifier set.

Step S804: Determine an identifier as a node, and connect nodes with a resource transfer relationship by using an undirected edge, to obtain a resource net transfer-out undirected graph.

A direction of the undirected edge represents a resource net transfer-out direction between the two nodes connected by the undirected edge. The resource net transfer-out direction is determined according to a plurality of resource transfers between the two nodes. For example, five resource transfers occur from the node a to the node b with a total resource amount of 30,000, and two resource transfers occur from the node b to the node a with a total resource amount of 20,000. In this case, it may be determined according to the seven resource transfers between the node a and node b that a resource net transfer-out direction between the two nodes is from the node a to the node b.

Each undirected edge has two attributes: one is a resource net transfer amount, and the other is time corresponding to the resource net transfer amount. The resource net transfer amount may be obtained by canceling and adding resource transfer amounts of the plurality of resource transfers between the nodes, for example, M(b, d)=(+mv1)+(−mv2)+(−mv3)+(+mv4)+(−mv5), where + represents transfer-out from the node b to the node d, and − represents transfer-out from the node d to the node b. The time corresponding to the resource net transfer amount may be obtained by integrating occurrence time of the plurality of resource transfers between the nodes. A specific integration manner may be weighted integration based on the resource transfer amount of each resource transfer. For example, time corresponding to a resource net transfer amount between the node b and the node d is T(b, d)=tv1×mv1/(mv1+mv2+mv3+mv4+mv5)+tv2×mv2/(mv1+mv2+mv3+mv4+mv5)+tv3×mv3/(mv1+mv2+mv3+mv4+mv5)+tv4×mv4/(mv1+mv2+mv3+mv4+mv5)+tv5×mv5/(mv1+mv2+mv3+mv4+mv5).

Specifically, refer to the foregoing examples.

Step S806: Determine a node satisfying a preset starting node condition in nodes in the resource net transfer-out undirected graph as a starting node for current path search.

Step S808: Denote a resource net transfer-out amount from the starting node to a node that the starting node points to as M, form, when M is greater than or equal to a resource transfer amount threshold $M_0$, a current resource transfer path based on the starting node and the node that the starting node points to, and determine the node that the starting node points to as a current search node.

Step S810: Determine the starting node as a reference node, and determine a node that the current search node points to as a candidate node.

Step S812: Determine time corresponding to a resource net transfer-out amount between the reference node and the current search node as first resource transfer time, and determine time corresponding to a resource net transfer-out amount between the current search node and the candidate node as second resource transfer time.

The first resource transfer time is denoted as T(i−1, i). The second resource transfer time is denoted as T(i, i+1). i−1 represents the reference node pointing to the current search node. i represents the current search node. i+1 represents the candidate node that the current search node points to.

Step S814: Obtain a resource net transfer amount between the reference node and the current search node and the resource net transfer-out amount between the current search node and the candidate node when the first resource transfer time is earlier than the second resource transfer time, add the candidate node to the current resource transfer path when the resource net transfer amount is approximate to the resource net transfer-out amount, and perform, by taking the current search node as a reference node, the candidate node as a current node, and a node that the candidate node points to as a candidate node, path search until a termination condition is satisfied, to obtain a target resource transfer path.

That is, if the first resource transfer time is earlier than the second resource transfer time, that is, T(i−1, i)<T(i, i+1), the resource net transfer amount M(i−1, i) between the reference node and the current search node and the resource net transfer-out amount M(i, i+1) between the current search node and the candidate node are obtained. If M(i−1, i) is approximate to M(i, i+1), the candidate node is added to the current resource transfer path, and path search is performed by taking the current search node as the reference node, the candidate node as the current node, and the node that the candidate node points to as the candidate node until the termination condition is satisfied, to obtain the target resource transfer path.

The following manner is used to determine that M(i−1, i) is approximate to M(i, i+1): when M(i−1, i)/M(i, i+1)∈(1−$p_{loss}$, 1+$p_{loss}$), it may be determined that M(i−1, i) is approximate to M(i, i+1), where $p_{loss}$∈(0.1 to 0.2).

The termination condition includes any one of the following:
(1) a length of the currently found resource transfer path reaches a preset maximum length;
(2) an out-degree of the current search node is equal to 0, that is, there is no candidate node corresponding to the current search node; and
(3) the candidate node that the current search node points to does not include a node satisfying a condition of adding to the current resource transfer path.

Step S816: Store, after current path search is completed, a sub-path corresponding to each node for which there are a plurality of incoming edges on the target resource transfer path as a path attribute of the corresponding node.

Step S818: Determine a next node satisfying the preset starting node condition in the nodes in the resource net transfer-out undirected graph, perform resource transfer path search according to the manner from steps S808 to S816, and directly read and concatenate, when one of found nodes has a path attribute, the path attribute to the current resource transfer path that is currently found until path search is ended.

Step S820: Perform step S808 to continue performing path search when there is still a starting node that is not accessed in the resource net transfer-out undirected graph.

During path search, nodes (identifiers) in the current resource transfer path are recorded. If the current search node is in the current resource transfer path, it indicates that the current search node has been accessed, and a node loop formed by nodes is encountered. In this case, the server stops access, determines the current resource transfer path as a target resource transfer path obtained by current search, and starts next path search. In this way, infinitely cyclic node access and computing resource wastes may be avoided.

In this application example, a resource transfer relationship graph is constructed based on a resource transfer relationship and a resource transfer direction between resource transfer identifiers. The resource transfer relationship graph may accurately reflect a resource transfer situation between the resource transfer identifiers, and is favorable for accurately recognizing a transfer path of a resource of an unauthenticated source from massive resource transfers and improving path recognition efficiency. In addition, in a process in which resource transfer path search is performed on the resource transfer relationship graph, when first resource transfer time between a current search node and a reference node and second resource transfer time between the current search node and a candidate node satisfy a time difference condition, the candidate node is added to a current resource transfer path, to indicate that a target resource flows from the reference node sequentially to the current node and the candidate node in a chronological order, so that a flowing direction of the target resource may be reflected accurately. Nodes are sequentially added in this manner, thereby accurately recognizing a target resource transfer path of the target resource. This improves path recognition accuracy.

It is to be understood that, although each step in the flowcharts of FIG. 1 to FIG. 8 is sequentially presented according to indications of arrowheads, these steps are not necessarily performed according to sequences indicated by the arrowheads. Unless otherwise explicitly specified herein, execution of the steps is not strictly limited, and the steps may be performed in other sequences. Moreover, at least some steps in FIG. 1 to FIG. 8 may include a plurality of sub-steps or a plurality of stages. The sub-steps or stages are not necessarily performed at the same time, and may be performed at different time. The sub-steps or stages are not necessarily performed in order, and may be performed in turn or alternately with other steps or at least some sub-steps or stages of other steps.

Figure 9:
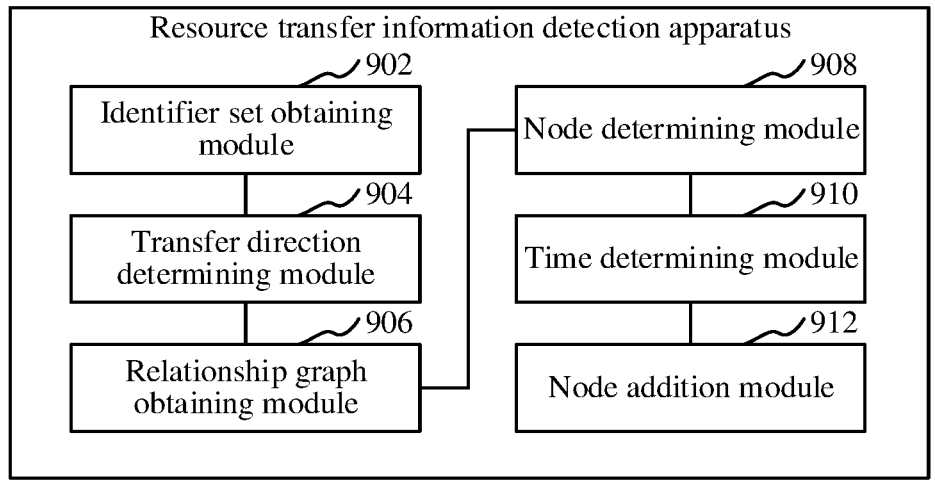
FIG. 9 is a block diagram of a structure of a resource transfer information detection apparatus according to some examples.

As shown in FIG. 9, a resource transfer information detection apparatus is provided, which includes:

- an identifier set obtaining module 902, configured to obtain a resource transfer identifier set on which malicious resource transfer detection is to be performed, the resource transfer identifier set including a plurality of resource transfer identifiers;
- a transfer direction determining module 904, configured to obtain a resource transfer identifier pair corresponding to the resource transfer identifier set, and determine a resource transfer direction corresponding to the resource transfer identifier pair, each resource transfer identifier pair including two resource transfer identifiers with a resource transfer relationship in the resource transfer identifier set;
- a relationship graph obtaining module 906, configured to determine a resource transfer identifier in the resource transfer identifier set as a node in a resource transfer relationship graph, and perform directed edge connection on nodes corresponding to the resource transfer identifier pair according to the resource transfer direction to obtain the resource transfer relationship graph;
- a node determining module 908, configured to determine, in a process of performing resource transfer path search on the resource transfer relationship graph, a current search node in a current resource transfer path that is currently found, determine a node that points to the current search node and that is in the current resource transfer path as a reference node, and determine a node that the current search node points to and that is in the resource transfer relationship graph as a candidate node;
- a time determining module 910, configured to determine first resource transfer time between the current search node and the reference node and second resource transfer time between the current search node and the candidate node; and
- a node addition module 912, configured to add, in response to determining that the first resource transfer time and the second resource transfer time satisfy a time difference condition, the candidate node to the current resource transfer path to obtain a target resource transfer path, the time difference condition is a time difference condition of flowing of a target resource from the reference node sequentially to the current search node and the candidate node.

The time determining module 910 is further configured to: obtain a resource transfer record set between the current search node and the reference node, the resource transfer record set including a plurality of resource transfer records; obtain resource transfer time and a resource transfer value in each resource transfer record; determine a time weight corresponding to the resource transfer time based on the resource transfer value, the time weight is in positive correlation with the resource transfer value; and perform weighted calculation on the resource transfer time in the resource transfer record set based on the time weight corresponding to the resource transfer time to obtain the first resource transfer time between the current search node and the reference node.

The time determining module 910 is further configured to: perform sum calculation on resource transfer values in the resource transfer record set to obtain a resource transfer statistical value; and calculate a ratio of the resource transfer value to the resource transfer statistical value, and determine the ratio as the time weight corresponding to the resource transfer time.

The first resource transfer time is first last resource transfer time from the reference node to the current search node, and the second resource transfer time is second initial resource transfer time from the current search node to the candidate node. The node addition module 912 is further configured to determine a time sequence between the first last resource transfer time and the second initial resource transfer time, and determine, when the time sequence indicates that the first last resource transfer time is earlier than the second initial resource transfer time, that the first resource transfer time and the second resource transfer time satisfy the time difference condition.

The node addition module 912 is further configured to: obtain a first time difference value between the first last resource transfer time and the second initial resource transfer time when the time sequence indicates that the first last resource transfer time is later than the second initial resource transfer time; obtain first initial resource transfer time from the reference node to the current search node, obtain second last resource transfer time from the current search node to the candidate node, and obtain a second time difference value between the second last resource transfer time and the first initial resource transfer time; and calculate a time ratio between the first time difference value and the second time difference value, and determine, when the time ratio is less than a preset ratio threshold, that the first resource transfer time and the second resource transfer time satisfy the time difference condition.

The node addition module 912 is further configured to obtain a first resource transfer amount of transfer from the reference node to the current search node and a second resource transfer amount of transfer from the current search node to the candidate node, and add, when the first resource transfer time and the second resource transfer time satisfy the time difference condition and a resource amount difference between the first resource transfer amount and the second resource transfer amount is less than a preset amount difference, the candidate node to the current resource transfer path to detect the target resource transfer path.

The node addition module 912 is further configured to obtain a first resource transfer amount of transfer from the reference node to the current search node and a second resource transfer amount of transfer from the current search node to the candidate node, and add, when a resource transfer time difference satisfies the time difference condition and a resource amount difference between the first resource transfer amount and the second resource transfer amount is less than a preset amount difference, the candidate node to the current resource transfer path to obtain the target resource transfer path.

The node addition module 912 is further configured to calculate a resource amount ratio between the first resource transfer amount and the second resource transfer amount; determine the resource amount ratio as the resource amount difference; and determine, when the resource amount ratio is greater than a first threshold and less than a second threshold, that the resource amount difference between the first resource transfer amount and the second resource transfer amount is less than the preset amount difference. The first threshold is less than 1, and the second threshold is greater than 1.

The node addition module 912 is further configured to: obtain a path attribute identifier corresponding to the candidate node when the first resource transfer time and the second resource transfer time satisfy the time difference condition, the path attribute identifier is added to a node for which there are a plurality of incoming edges in an existing target resource transfer path, and the path attribute identifier is used for identifying a sub-path starting from the node for which there are the plurality of incoming edges in the existing target resource transfer path; and obtain, based on the path attribute identifier, a sub-path starting from the candidate node, and concatenate the sub-path to the current resource transfer path to detect the target resource transfer path.

The node determining module 908 is configured to determine a node satisfying a preset starting node condition in nodes in the resource transfer relationship graph as a starting node of the current resource transfer path. The preset starting node condition includes at least one of the following conditions: an out-degree of the node is greater than 0, and an in-degree of the node is less than or equal to a preset threshold; and a ratio of a total resource transfer-in amount of the node to a total resource transfer-out amount of the node is less than a preset ratio.

The node determining module 908 is configured to form, when a resource transfer amount from the starting node to a node that the starting node points to is greater than or equal to a resource transfer amount threshold, the current resource transfer path based on the starting node and the node that the starting node points to, and determine the node that the starting node points to as the current search node.

For specific limitations on the resource transfer information detection, refer to the above limitations on the resource transfer information detection method, and elaborations are omitted herein. Each module in the resource transfer information detection apparatus may be implemented entirely or partially through software, hardware, or a combination thereof. Each module may be embedded into or independent of a processor in a computer device in a hardware form, or may be stored in a software form in a memory in a computer device, for the processor to invoke to perform the operation corresponding to each module.

The term module (and other similar terms such as unit, subunit, submodule, etc.) in the present disclosure may refer to a software module, a hardware module, or a combination thereof. Modules implemented by software are stored in memory or non-transitory computer-readable medium. The software modules, which include computer instructions or computer code, stored in the memory or medium can run on a processor or circuitry (e.g., ASIC, PLA, DSP, FPGA, or other integrated circuit) capable of executing computer instructions or computer code. A hardware module may be implemented using one or more processors or circuitry. A processor or circuitry can be used to implement one or more hardware modules. Each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices and stored in memory or non-transitory computer readable medium.

Figure 10:
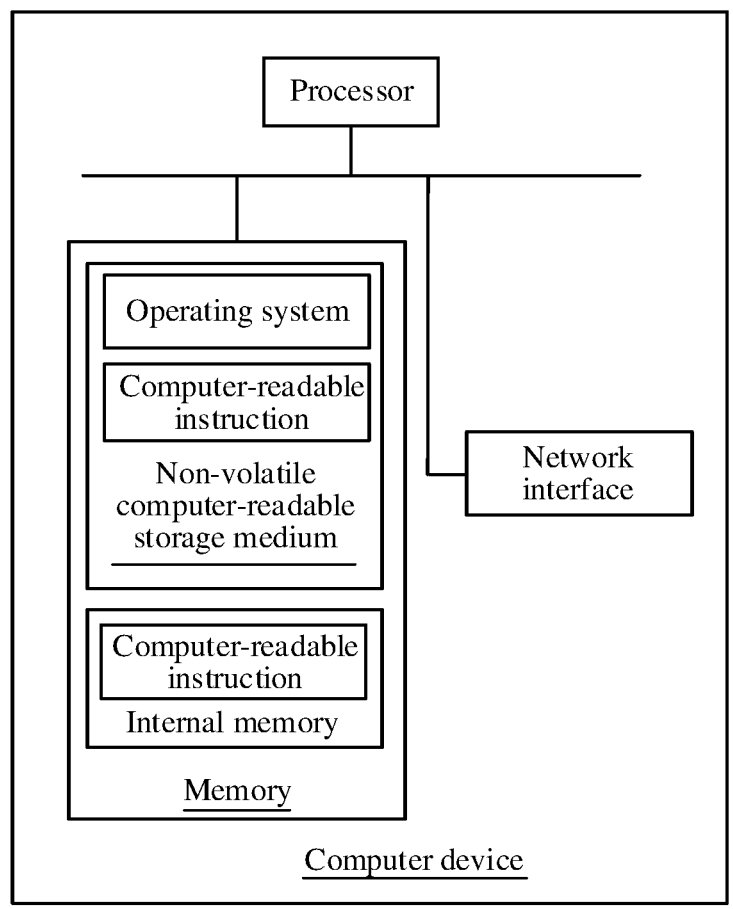
FIG. 10 is a diagram of an internal structure of a computer device according to some examples.

A computer device is provided. FIG. 10 is a diagram of an internal structure of the computer device. The computer device may be the server 104 in FIG. 1. The computer device includes a processor, a memory, and a network interface which are connected through a system bus. The processor of the computer device is configured to provide calculation and control capabilities. The memory of the computer device includes a non-transitory computer-readable storage medium, and an internal memory. The non-transitory computer-readable storage medium stores an operating system, a computer program, and a database. The internal memory provides a running environment for the operating system and the computer program in the non-transitory storage medium. The database of the computer device is configured to store resource transfer information detection data. The network interface of the computer device is configured to be connected to an external terminal for communication through a network. The computer program is executed by the processor to implement a resource transfer information detection method.

It may be understood by a person skilled in the art that the structure shown in FIG. 10 is merely a block diagram of a partial structure related to the solutions of the present subject matter and not intended to limit the computer device to which the solutions of the present subject matter are applied. The computer device may specifically include more or fewer components than those shown in the figure, or some components are combined, or different component arrangements are used.

A computer device is provided, which includes a memory and a processor. The memory stores computer-readable instructions. The computer-readable instructions are executed by the processor to enable the processor to perform the resource transfer information detection method of the present subject matter.

A non-transitory computer-readable storage medium is provided. The computer-readable storage medium stores computer-readable instructions. The computer-readable instructions are executed by a processor to enable the processor to perform the resource transfer information detection method of the present subject matter.

A computer program product or computer program is provided. The computer program product or computer program includes computer-readable instructions. The computer-readable instructions are stored in a computer-readable storage medium. A processor of a computer device reads the computer-readable instructions from the computer-readable storage medium. The processor executes the computer-readable instructions to enable the computer device to perform the resource transfer information detection method of the present subject matter.

User information (including, but not limited to, user equipment information, personal information of a user, and the like) and data (including, but not limited to, data for analysis, stored data, displayed data, and the like) involved in the present subject matter are authorized by the user or fully authorized by all parties.

It may be understood by a person of ordinary skill in the art that all or some processes in the method of the foregoing examples may be completed by computer-readable instructions instructing related hardware. The computer-readable instructions may be stored in a non-transitory computer-readable storage medium. When the computer-readable instructions are executed, the processes in each of the foregoing method examples may be included. References to the memory, storage, the database, or another medium used in the examples provided in the present subject matter may all include at least one of non-volatile and volatile memories. The non-volatile memory may include a read-only memory (ROM), a magnetic tape, a floppy disk, a flash memory, an optical memory, and the like. The volatile memory may include a random access memory (RAM) or an external cache. As a description rather than a restriction, the RAM may be in various forms, for example, a static RAM (SRAM) or a dynamic RAM (DRAM).

Technical features of the foregoing examples may be randomly combined. For conciseness of description, not all possible combinations of the technical features in the foregoing examples are described. However, the combinations of these technical features shall be considered as falling within the scope recorded in this specification provided that no conflict exists.

The foregoing examples describe merely several implementations of the present subject matter specifically and in detail, but cannot be construed as a limitation to the patent scope of the present disclosure. A person of ordinary skill in the art may further make a plurality of transformations and improvements without departing from the concept of the present subject matter. These transformations and improvements fall within the protection scope of the present subject matter. Therefore, the patent protection scope of the present subject matter shall be subject to the appended claims.

The invention claimed is:

1. A resource transfer information detection method performed by a computer device, comprising:
   obtaining a resource transfer identifier set comprising a plurality of resource transfer identifiers;
   obtaining a resource transfer identifier pair corresponding to the resource transfer identifier set;
   determining a resource transfer direction corresponding to the resource transfer identifier pair, wherein
      each resource transfer identifier pair includes two resource transfer identifiers with a resource transfer relationship in the resource transfer identifier set;
   determining a resource transfer identifier in the resource transfer identifier set as a node in a resource transfer relationship graph;
   performing directed edge connection on nodes corresponding to the resource transfer identifier pair according to the resource transfer direction to obtain the resource transfer relationship graph;
   determining, in a process of performing resource transfer path search on the resource transfer relationship graph, a current search node in a current resource transfer path that is currently found;
   determining a node that points to the current search node and that is in the current resource transfer path as a reference node;
   determining a node that the current search node points to and that is in the resource transfer relationship graph as a candidate node;
   determining a first resource transfer time between the current search node and the reference node and a second resource transfer time between the current search node and the candidate node; and
   adding, when the first resource transfer time and the second resource transfer time satisfy a time difference condition, the candidate node to the current resource transfer path to detect a target resource transfer path, wherein
      the time difference condition is a time difference condition of flowing of a target resource from the reference node sequentially to the current search node and the candidate node.

2. The method according to claim 1, wherein the determining the first resource transfer time between the current search node and the reference node comprises:
   obtaining a resource transfer record set between the current search node and the reference node, wherein the resource transfer record set comprises a plurality of resource transfer records;
   obtaining resource transfer time and a resource transfer value in each resource transfer record;
   determining a time weight corresponding to the resource transfer time based on the resource transfer value, the time weight is in positive correlation with the resource transfer value; and
   performing weighted calculation on the resource transfer time in the resource transfer record set based on the time weight corresponding to the resource transfer time to obtain the first resource transfer time between the current search node and the reference node.

3. The method according to claim 2, wherein the determining the time weight corresponding to the resource transfer time based on the resource transfer value comprises:
   summing resource transfer values in the resource transfer record set to obtain a resource transfer statistical value;
   calculating a ratio of the resource transfer value to the resource transfer statistical value; and
   determining the ratio as the time weight corresponding to the resource transfer time.

4. The method according to claim 1, wherein
   the first resource transfer time is first last resource transfer time from the reference node to the current search node;
   the second resource transfer time is second initial resource transfer time from the current search node to the candidate node; and
   the determining that the first resource transfer time and the second resource transfer time satisfy a time difference condition comprises:
      determining a time sequence between the first last resource transfer time and the second initial resource transfer time; and
      determining, when the time sequence indicates that the first last resource transfer time is earlier than the second initial resource transfer time, that the first resource transfer time and the second resource transfer time satisfy the time difference condition.

5. The method according to claim 4, further comprising:
obtaining a first time difference value between the first last resource transfer time and the second initial resource transfer time such that the time sequence indicates that the first last resource transfer time is later than the second initial resource transfer time;
obtaining first initial resource transfer time from the reference node to the current search node;
obtaining second last resource transfer time from the current search node to the candidate node;
obtaining a second time difference value between the second last resource transfer time and the first initial resource transfer time;
calculating a time ratio between the first time difference value and the second time difference value; and
determining, when the time ratio is less than a preset ratio threshold, that the first resource transfer time and the second resource transfer time satisfy the time difference condition.

6. The method according to claim 1, wherein the adding, when the first resource transfer time and the second resource transfer time satisfy a time difference condition, the candidate node to the current resource transfer path to detect a target resource transfer path comprises:
obtaining a first resource transfer amount from the reference node to the current search node and a second resource transfer amount from the current search node to the candidate node; and
adding, when the first resource transfer time and the second resource transfer time satisfy the time difference condition and a resource amount difference between the first resource transfer amount and the second resource transfer amount is less than a preset amount difference, the candidate node to the current resource transfer path to detect the target resource transfer path.

7. The method according to claim 6, wherein the determining of the resource amount difference between the first resource transfer amount and the second resource transfer amount comprises:
calculating a resource amount ratio between the first resource transfer amount and the second resource transfer amount;
determining the resource amount ratio as the resource amount difference; and
the determining that the resource amount difference between the first resource transfer amount and the second resource transfer amount is less than a preset amount difference comprises:
determining, when the resource amount ratio is greater than a first threshold and less than a second threshold, that the resource amount difference between the first resource transfer amount and the second resource transfer amount is less than the preset amount difference, the first threshold is less than 1, and the second threshold is greater than 1.

8. The method according to claim 1, wherein the adding, when the first resource transfer time and the second resource transfer time satisfy a time difference condition, the candidate node to the current resource transfer path comprises:
obtaining a path attribute identifier corresponding to the candidate node when the first resource transfer time and the second resource transfer time satisfy the time difference condition, wherein the path attribute identifier is added to a node for which there are a plurality of incoming edges in an existing target resource transfer path, and
the path attribute identifier is used for identifying a sub-path starting from the node for which there are the plurality of incoming edges in the existing target resource transfer path;
obtaining, based on the path attribute identifier, a sub-path starting from the candidate node; and
concatenating the sub-path to the current resource transfer path to detect the target resource transfer path.

9. The method according to claim 1, further comprising:
determining a node satisfying a preset starting node condition in nodes in the resource transfer relationship graph as a starting node of the current resource transfer path, wherein
the preset starting node condition comprises at least one of the following conditions:
an out-degree of the node is greater than 0, and
an in-degree of the node is less than or equal to a preset threshold; and
a ratio of a total resource transfer-in amount of the node to a total resource transfer-out amount of the node is less than a preset ratio.

10. The method according to claim 9, wherein the determining the current search node in the current resource transfer path that is currently found comprises:
forming, when a resource transfer amount from the starting node to a node that the starting node points to is greater than or equal to a resource transfer amount threshold, the current resource transfer path based on the starting node and the node that the starting node points to; and
determining the node that the starting node points to as the current search node.

11. A resource transfer information detection apparatus, comprising:
an identifier set obtaining module configured to obtain a resource transfer identifier set, wherein
the resource transfer identifier set comprises a plurality of resource transfer identifiers;
a transfer direction determining module configured to:
obtain a resource transfer identifier pair corresponding to the resource transfer identifier set, and
determine a resource transfer direction corresponding to the resource transfer identifier pair, wherein
each resource transfer identifier pair comprises two resource transfer identifiers with a resource transfer relationship in the resource transfer identifier set;
a relationship graph obtaining module configured to:
determine a resource transfer identifier in the resource transfer identifier set as a node in a resource transfer relationship graph, and
perform directed edge connection on nodes corresponding to the resource transfer identifier pair according to the resource transfer direction to obtain the resource transfer relationship graph;
a node determining module configured to:
determine, in a process of performing resource transfer path search on the resource transfer relationship graph, a current search node in a current resource transfer path that is currently found,
determine a node that points to the current search node and that is in the current resource transfer path as a reference node, and determine a node that the current search node points to and that is in the resource transfer relationship graph as a candidate node;

a time determining module configured to determine a first resource transfer time between the current search node and the reference node and a second resource transfer time between the current search node and the candidate node; and a node addition module configured to add, when the first resource transfer time and the second resource transfer time satisfy a time difference condition, the candidate node to the current resource transfer path to detect a target resource transfer path, the time difference condition is a time difference condition of flowing of a target resource from the reference node sequentially to the current search node and the candidate node.

12. The apparatus according to claim 11, wherein the time determining module is further configured to:

obtain a resource transfer record set between the current search node and the reference node, wherein
the resource transfer record set comprises a plurality of resource transfer records;

obtain resource transfer time and a resource transfer value in each resource transfer record;

determine a time weight corresponding to the resource transfer time based on the resource transfer value, wherein
the time weight is in positive correlation with the resource transfer value; and perform weighted calculation on the resource transfer time in the resource transfer record set based on the time weight corresponding to the resource transfer time to obtain the first resource transfer time between the current search node and the reference node.

13. The apparatus according to claim 11, wherein the time determining module is further configured to:

sum resource transfer values in the resource transfer record set to obtain a resource transfer statistical value; and calculate a ratio of the resource transfer value to the resource transfer statistical value, and determine the ratio as a time weight corresponding to the resource transfer time.

14. The apparatus according to claim 11, wherein the first resource transfer time is first last resource transfer time from the reference node to the current search node, the second resource transfer time is second initial resource transfer time from the current search node to the candidate node, and the node addition module is further configured to:
determine a time sequence between the first last resource transfer time and the second initial resource transfer time, and determine, when the time sequence indicates that the first last resource transfer time is earlier than the second initial resource transfer time, that the first resource transfer time and the second resource transfer time satisfy the time difference condition.

15. The apparatus according to claim 14, wherein the node addition module is further configured to:

obtain a first time difference value between the first last resource transfer time and the second initial resource transfer time when the time sequence indicates that the first last resource transfer time is later than the second initial resource transfer time;

obtain first initial resource transfer time from the reference node to the current search node;

obtain second last resource transfer time from the current search node to the candidate node;

obtain a second time difference value between the second last resource transfer time and the first initial resource transfer time;

calculate a time ratio between the first time difference value and the second time difference value; and determine, when the time ratio is less than a preset ratio threshold, that the first resource transfer time and the second resource transfer time satisfy the time difference condition.

16. The apparatus according to claim 11, wherein the node addition module is further configured to:

obtain a first resource transfer amount from the reference node to the current search node and a second resource transfer amount from the current search node to the candidate node; and add, when the first resource transfer time and the second resource transfer time satisfy the time difference condition and a resource amount difference between the first resource transfer amount and the second resource transfer amount is less than a preset amount difference, the candidate node to the current resource transfer path to detect the target resource transfer path.

17. The apparatus according claim 11, wherein the node determining module is further configured to:

determine a node satisfying a preset starting node condition in nodes in the resource transfer relationship graph as a starting node of the current resource transfer path, wherein
the preset starting node condition comprises at least one of the following conditions:
an out-degree of the node is greater than 0, and
an in-degree of the node is less than or equal to a preset threshold; and
a ratio of a total resource transfer-in amount of the node to a total resource transfer-out amount of the node is less than a preset ratio.

18. A computer device, comprising a memory and a processor, the memory storing computer-readable instructions executable by the processor to configure the processor to implement the method according to claim 1.

19. A non-transitory computer-readable storage medium, the computer-readable storage medium storing computer-readable instructions executable by a processor to configure the processor to implement the method according to claim 1.

* * * * *